Nov. 28, 1967  H. RABIN  3,355,741
DATA CURVE AMPLITUDE RECORDER
Filed Nov. 29, 1965
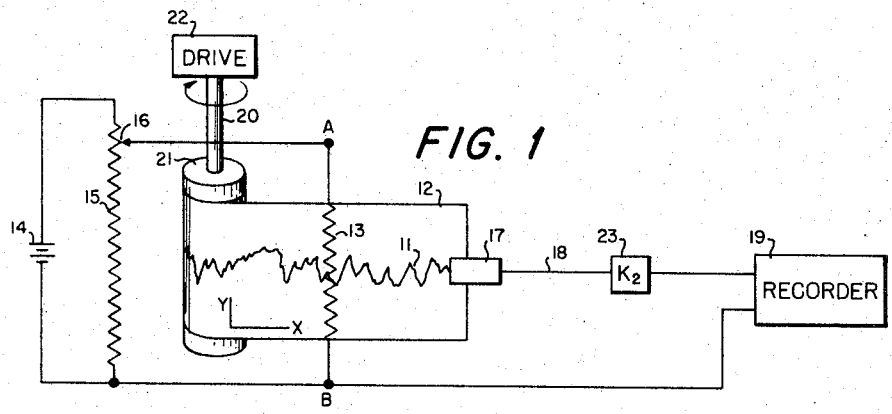
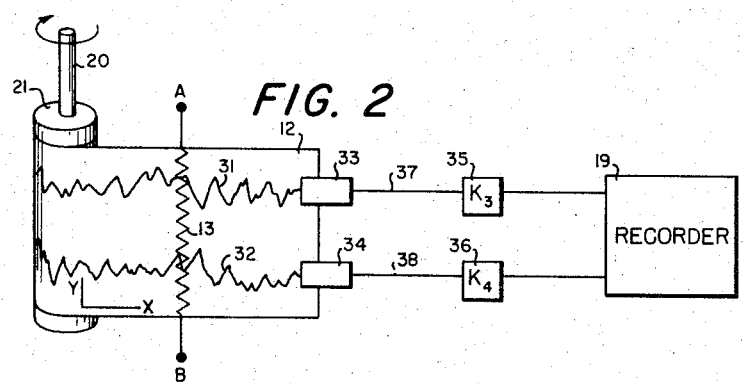
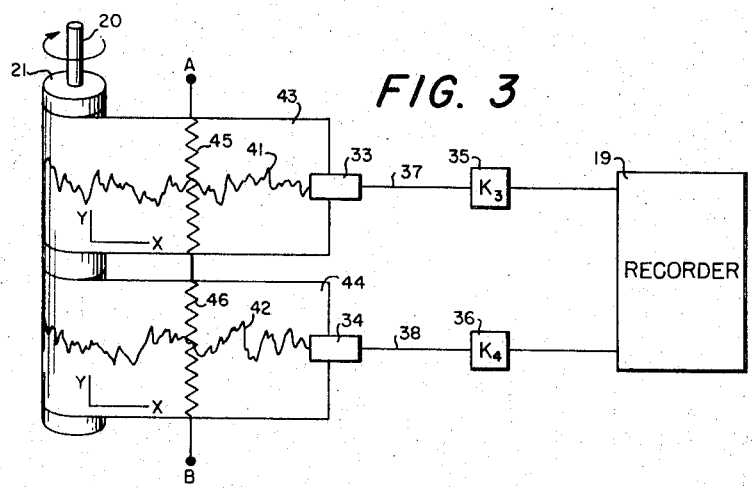
INVENTOR
HERBERT RABIN

3,355,741
Patented Nov. 28, 1967

3,355,741
DATA CURVE AMPLITUDE RECORDER
Herbert Rabin, 2935 Kanawha St.,
Washington, D.C. 20015
Filed Nov. 29, 1965, Ser. No. 510,479
11 Claims. (Cl. 346—33)

ABSTRACT OF THE DISCLOSURE

An automatic indicia producing device for obtaining an indicia correlative to the amplitude of a single curve or correlative to the difference of amplitude between two curves wherein the curves are composed of conductive material and wherein a resistor is placed in electrical contact with the curves. A voltage is impressed across the resistor and that part of the voltage which appears across the resistor between two curves is proportional to the difference in amplitude between the curves. Where the amplitude of only one curve is to be measured the voltage on the resistor between that curve and a reference point of potential is proportional to the amplitude of the curve.

---

The present invention relates to a device for obtaining an indicia correlative to the amplitude of a single curve or to the difference in amplitude between two curves and, more particularly, to a device for obtaining a curve correlative to the amplitude of a single curve composed of conductive material or to the difference in amplitude between two curves composed of conductive material.

Heretofore, when it has been desired to obtain a curve representative of a given curve or of the difference in amplitude between two given curves, with or without a change in scale, the use of either tedious mechanical steps or expensive computer performed steps has been involved. For example, it is known that a curve representative of the difference in amplitude between two curves can be obtained by using dividers to mark off such difference at a number of selected data points and then using the dividers to plot the measured difference with or without a change in scale. As another example, it is known that the difference in amplitude between two curves at a number of selected data points may be read into a computer with the computer thereafter performing any desired operation on the input information to provide given changes in scale and subsequently reading out the difference information with such desired changes in scale.

The general purpose of this invention is to provide a device for obtaining a curve correlative to the amplitude of a curve or to the difference in amplitude between two curves which embraces all the advantages of similarly employed prior art devices and possesses none of the aforedescribed disadvantages. To obtain this, the present invention contemplates forming the curve or curves of electrically conductive material, placing a conductive member across the curve or curves, impressing a voltage across this conductive member, creating relative motion between the conductive member and curve or curves, and connecting an indicia producing means to the conductive member to thereby provide an indicia correlative to the amplitude of the single curve or difference in amplitude between two curves.

An object of the present invention is the provision of an accurate, inexpensive, and simple device for obtaining an indicia correlative to the amplitude of a curve.

Another object is to provide a device for obtaining a curve which is either a linear or nonlinear function of a given curve.

A further object of the invention is the provision of an accurate, inexpensive, and simple device for obtaining an indicia correlative to the difference in amplitude between two given curves.

Still another object is to provide a device for obtaining a curve which is either a linear or nonlinear function of the difference in amplitude between two given curves.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates the present invention as used to obtain an indicia correlative to the amplitude of a single curve;

FIG. 2 shows the present invention as used to obtain an indicia correlative to the difference in amplitude between the two curves disposed on a common supporting material;

FIG. 3 illustrates the present invention as used to obtain an indicia correlative to the difference in amplitude between two given curves respectively disposed on separate pieces of supporting material.

Turning now to FIG. 1 wherein a device according to the present invention suitable for obtaining an indicia correlative to variations in amplitude of a single curve is shown, curve 11, which is composed of a suitable electrically conductive material, is disposed on a suitable insulating material 12 and contains information expressible in terms of time along the $x$-axis and in terms of voltage along the $y$-axis of an orthogonal coordinate system. In the instance where curve 11 is obtained as the output of a recorder, it may be recorded using a conductive ink or it may be traced with conductive ink or a conductive stripping after having been originally recorded.

If curve 11, as originally obtained, contains time information along the $x$-axis and voltage information along the $y$-axis, it may be directly operated upon in accordance with this invention. However, if curve 11 contains information other than time along the $x$-axis and/or voltage along the $y$-axis, before operating on curve 11 in accordance with this invention, it is necessary to convert the information along the $x$-axis to an equivalent time base and the information along the $y$-axis to an equivalent voltage base. This may be done in accordance with procedures well known in the art.

As shown in FIG. 1, resistor 13 extends across sheet 12 in a linear path and is maintained in electrical contact with curve 11. Voltage supply 14 impresses a direct current voltage across potentiometer 15 and a portion of this voltage, as determined by the setting of slider 16, is impressed across resistor 13. Curve 11 is electrically coupled to one input of a suitable indicia producing means, such as recorder 19, by a suitable electrical connector 17 and flexible lead 18. The other input to recorder 19 is connected in common to one end of each of resistor 13, voltage supply 14, and potentiometer 15 thereby establishing a reference potential for the system.

Relative motion between curve 11 and resistor 13 is caused by the rotation of drum 21 to which sheet 12 is attached in a conventional fashion. This rotation is caused by driver 22 which may be any of the well known suitable devices for causing such rotation. Of course, it should be understood that this relative motion could be achieved by holding sheet 12 stationary and moving resistor 13.

In many instances it is advantageous to insert an electrical mathematical operator 23 (such, for example, as a divider, multiplier, logarithmic potentiometer, etc.) between curve 11 and recorder 19. The function of operator 23 is to provide an output which is a mathematical function, either linear or nonlinear, of the input thereto.

Thus, it can be seen that the voltage applied to the input of recorder 19 at any instant is correlative to the voltage across that portion of resistor 13 which is connected between curve 11 and the reference potential at that instant and that this voltage will vary as resistor 13 contacts various points on curve 11 having different amplitudes.

In accordance with the teachings of the present invention, it is possible to have the input to recorder 19 at any instant be a linear function of the amplitude of the point on curve 11 with which resistor 13 is making contact at that instant. This result is achieved when resistor 13 and operator 23 have linear characteristics. It is also contemplated by the present invention that the correlation between the input to recorder 19 and the amplitude of curve 11 be nonlinear. This result is achieved when either or both resistor 13 and operator 23 have nonlinear characteristics.

Driver 22 may rotate drum 21 at a rate which is either a linear or nonlinear function of the time represented along the x-axis depending on the desired scale of x-axis information at the output of recorder 19.

Only minor modifications of the present invention as illustrated in FIG. 1 need be made to obtain an indicia correlative to the difference in amplitude between two curves. These differences are illustrated in FIG. 2. Resistor 13 is maintained in electrical contact with curves 31 and 32 which are composed of electrically conductive material disposed on an insulating material 12 and which are coupled across the input to recorder 19 by electrical connectors 33 and 34 and flexible leads 37 and 38.

As described to this point, the instantaneous input to recorder 19 is equal to the instantaneous voltage existing across the portion of resistor 13 which is connected between curves 31 and 32. However, in some instances it is desirable to have the instantaneous input to recorder 19 be a mathematical function of the instantaneous voltage appearing across the portion of resistor 13 which is connected between curves 31 and 32. This can be done by inserting mathematical operators 35 and 36 in the respective connections of curves 31 and 32 to recorder 19 as shown.

FIG. 3 illustrates a modification of FIG. 2 to make the present invention adaptable to obtain an indicia correlative to the difference in amplitude between two curves, 31 and 32 respectively, which are disposed on separate sheets of an insulating material, 41 and 42 respectively. Resistor 45 conductively engages curve 41 and resistor 46 conductively engages curve 42. Resistors 45 and 46 are coupled in series across the portion of potentiometer 15 as determined by the setting of slider 16 as illustrated in FIG. 1.

Of course, sheets 43 and 44 could be connected to separate drums in which case the drums could be driven at the same or different rates thereby giving the present invention greater flexibility.

It should be noted that the present invention is adaptable to the situation where one or both of the given curves has a different reference potential from that of the system of the present invention. Such a difference merely represents an axis translation and may be readily considered in analyzing the indicia obtained at the output of recorder 19 by means well known in the art.

It should now be clear that the present invention provides an accurate, inexpensive, and simple device for obtaining an indicia correlative to the amplitude of a given continuous curve and also a device for obtaining an indicia correlative to the difference in amplitude between two continuous curves.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In combination:

linearly movable conductive means having amplitude variations representing information expressible in terms of time along the x-axis and in terms of voltage along the y-axis of an orthogonal coordinate system;

a substantially lineal conductive element disposed transversely to the linear path of said conductive means and in electrical engagement therewith at a first point;

supply means connected to impress a voltage across said conductive element;

a second point of reference potential electrically connected to said conductive means and in physical contact with said conductive element to enable a voltage to appear between said first and second points correlative to the amplitude of said conductive means; and indicia producing means connected to receive the voltage appearing across said conductive element between said conductive means and said point of reference potential at any instant for producing an output indicia representative thereof.

2. A device for obtaining an indicia which is correlative to the amplitude of a data curve composed of electrically conductive material disposed on insulating material and containing information expressible in terms of time along the x-axis and in terms of voltage along the y-axis of an orthogonal coordinate system, said device comprising:

conductive means lying in a linear path and disposed to conductively engage said data curve at a first point;

supply means connected to apply a voltage across said conductive means;

a second point of reference potential in physical contact with said conductive means and electrically coupled to said first point and said data curve to enable a voltage to appear between said first and second points correlative to the amplitude of said data curve;

means imparting relative motion between said conductive means and said curve in a direction parallel to said x-axis and at a rate which is a function of the time represented along said x-axis, the voltage appearing across that portion of said conductive means which is between said first point and said second point of reference potential at any instant being a function of the amplitude of said curve at said any instant; and indicia producing means connected to receive said voltage appearing across said portion of said conductive means to thereby provide an indicia correlative to the amplitude of said curve at said any instant.

3. The device of claim 2 wherein:

the relative motion between said curve and said conductive means is at a rate which is a linear function of the time represented along said x-axis; and the voltage received by said indicia producing means at said any instant is a linear function of the amplitude of the point on said curve which is in electrical contact with said conductive means at said any instant;

whereby said indicia is a linear function of said curve.

4. The device of claim 2 wherein:

at least one of said rate of relative motion and said voltage received at said any instant by said indicia producing means is a nonlinear function of the time represented along said x-axis and the amplitude of the point on said curve contacted by said conductive means at said any instant respectively;

whereby said indicia is a nonlinear function of said curve.

5. The device of claim 2 further including mathematical operating means connected to receive as the input thereto the voltage appearing across said portion of said conductive means at said any instant and connected to energize said indicia producing means with an output voltage which differs by a mathematical function from said voltage appearing across said portion of said conductive means at said any instant.

6. A device for obtaining indicia which are correlative to the amplitude of a data curve composed of electrically conductive material disposed on insulating material and containing information expressible in terms of time along the x-axis and in terms of voltage along the y-axis of an orthogonal coordinate system, said device comprising:

conductive means lying in a linear path and disposed to conductively engage said data curve;

supply means connected to apply a voltage across said conductive means;

a point of reference potential in electrical common with said conductive means and said data curve;

means imparting relative motion between said conductive means and said curve in a direction parallel to said x-axis and a rate which is a function of the time represented along said x-axis, the voltage appearing across that portion of said conductive means which is between said curve and said point of reference potential at any instant being a function of the amplitude of said curve at said any instant;

indicia producing means connected to receive said voltage appearing across said portion of said conductive means to thereby provide an indicia correlative to the amplitude of said curve at said any instant;

wherein said point of reference potential is variable and is formed by an amplitude bearing curve of electrically conductive material disposed on insulating material and also containing information expressible in terms of time along the x-axis and in terms of voltage along the y-axis of said orthogonal coordinate system, said device operating to obtain an indicia which is correlative to the difference in amplitude between said data curve and said amplitude varying curve;

wherein said motion imparting means also imparts relative motion between said conductive means and said amplitude varying curve in a direction parallel to said x-axis and at a rate which is a function of the time represented along said x-axis whereby the voltage appearing across that portion of said conductive means which is between said curves at any instant is a function of the difference in amplitude between said curves at said any instant;

and wherein the indicia produced by said indicia producing means is correlative to the difference in amplitude between said curves.

7. The device of claim 6 wherein:

the relative motion between said curves and said conductive means is at a rate which is a linear function of the time represented along said x-axis; and the voltage received at any instant by said indicia producing means is a linear function of the difference in amplitude between the respective points on said curves contacted by said conductive means at said any instant;

whereby said indicia is a linear function of the difference in amplitude between said curves.

8. The device of claim 6 wherein:

at least one of said rate of relative motion and said voltage received at any instant by said indicia producing means is a nonlinear function of the time represented along said x-axis and the difference in amplitude between the respective points on said curves contacted by said conductive means at said any instant respectively;

whereby said indicia is a nonlinear function of the difference in amplitude between said curves.

9. The device of claim 6 further including mathematical operating means connected to receive as the input thereto the voltage appearing across said portion of said conductive means at said any instant and connected to energize said indicia producing means with an output voltage which differs by a mathematical function from said voltage appearing across said portion of said conductive means at said any instant.

10. The device of claim 6 wherein:

said conductive means is a resistive element lying in a path parallel to said y-axis; and said means imparting said relative motion is connected to said insulating material.

11. The device of claim 6 wherein said curves are respectively disposed on separate pieces of insulating material.

References Cited

UNITED STATES PATENTS

| | | | |
|---|---|---|---|
| 2,258,859 | 10/1941 | Mitelman | 235—61 |
| 2,748,487 | 6/1956 | Zimmermann | 235—61 |
| 2,837,706 | 6/1958 | Glassey | 318—31 |
| 2,866,596 | 12/1958 | Hoefs et al. | 235—61.6 |
| 2,875,389 | 2/1959 | Morrill et al. | 235—61.6 |
| 2,999,315 | 9/1961 | Benson | 33—1 |

RICHARD B. WILKINSON, *Primary Examiner.*

JOSEPH W. HARTARY, *Assistant Examiner.*